United States Patent Office 3,349,629
Patented Oct. 31, 1967

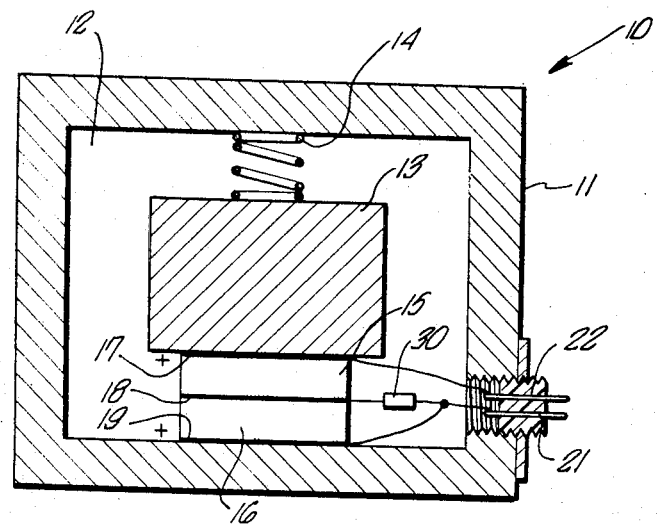
FIG_1_
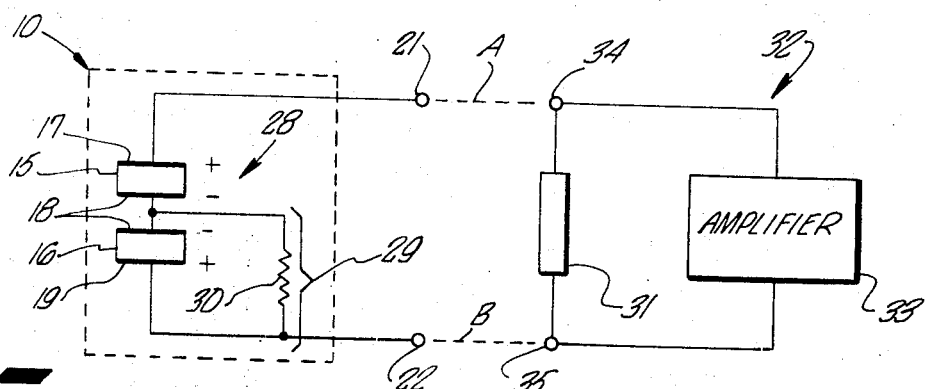
FIG_2_
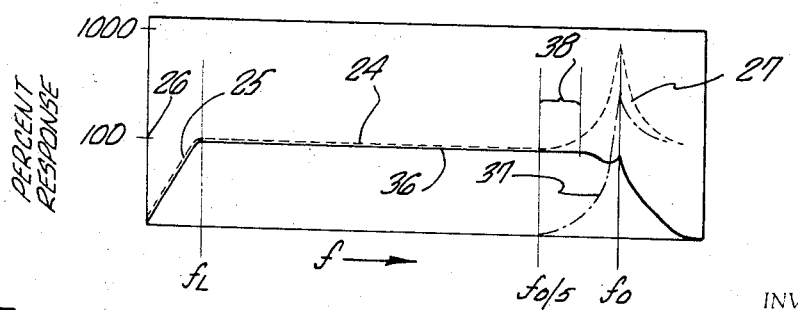
FIG_3_
INVENTOR.
SHMUEL ELAZAR
BY
Christie, Parker + Hale
ATTORNEYS.

3,349,629
FREQUENCY DAMPED TRANSDUCER
Shmuel Elazar, El Monte, Calif., assignor to Consolidated Electrodynamics Corporation, Pasadena, Calif., a corporation of California
Filed Sept. 8, 1964, Ser. No. 394,879
13 Claims. (Cl. 73—517)

This invention relates to transducers and, more particularly, to transducers which include electrical means for limiting or extending the frequency range over which the transducer has a flat response characteristic.

A piezoelectric transducer, like most transducers, can be considered as a resilient mechanical system. Accordingly, such a transducer has a mechanical resonant frequency. When the transducer is operating at or around its resonant frequency, the value of the transducer output signal is not truly representative of the value of the input to the transducer. For example, a piezoelectric accelerometer normally may have a response characteristic of 10 millivolts output per g input. As the frequency at which vibrations are applied to the transducer approaches the resonant frequency of the device, the transducer response increases non-linearly. For this reason, accelerometers, particularly piezoelectric accelerometers, are rated for operation in the lower portion, say the lower 20%, of the frequency range below the principle mechanical resonance frequency. This range provides a substantially linear response characteristic.

This invention provides means for electrically cancelling the effects of mechanical resonance in a transducer so that the useful frequency range of the transducer may be extended into the range in which the response of the transducer would otherwise be non-linear because of the effects of transducer resonance. Moreover, the invention may be used to limit the frequency range in which the transducer has a flat response. Although the invention is described with reference to a piezoelectric accelerometer, the methods and techniques of this invention are not restricted to such transducers.

Generally speaking, this invention provides a frequency damped transducer in that the signals generated internally of the transducer are damped electrically within the transducer and the degree of damping is a function of signal frequency. The transducer includes a member which is mounted for movement along a predetermined line in response to variations in a selected physical phenomenon to be measured by the transducer. The transducer includes signal generating means coupled to the movable member for generating first and second electrical signals which are proportional to the amount of movement of the member. Transducer output terminal means are provided. The invention also includes means for connecting the signal generating means to the terminal means to provide an output signal across the output terminal means which is representative of the difference in the amplitude of the first and second signals. Additionally, the transducer includes means tuned to a selected frequency and to which the second signal is applied for suppressing the second signal when signals vary in amplitude at a frequency which is less than the tuned frequency and for applying the second signal to the first signal when the signals vary in amplitude at a frequency above the tuned frequency.

Where it is desired that the transducer have a flat response characteristic into the frequency range in which transducer resonance would otherwise cause the response of the transducer to be non-linear, the tuned means is tuned to that frequency at which resonance effects begin to be manifested in the output of the first signal generating means. The suppression of the second signal decreases at substantially the same rate at which the magnitude of the first signal rises due to the effects of transducer resonance. Above the tuned frequency, these signals are subtracted from one another with the result that the output of the transducer, as measured at the terminal means, is flat up to and into the frequency range in which mechanical resonance occurs.

The above mentioned and other features of the invention will be more clearly understood from the following detailed description of the invention taken in conjunction with the accompanying drawings wherein:

FIG. 1 is a cross-sectional elevation view of the piezoelectric accelerometer embodying the present invention;

FIG. 2 is an electrical schematic diagram of the transducer shown in FIG. 1;

FIG. 3 is a graph of the response of the transducer shown in FIG. 1 when the transducer is frequency damped for extension of its operational range;

Figure 4:
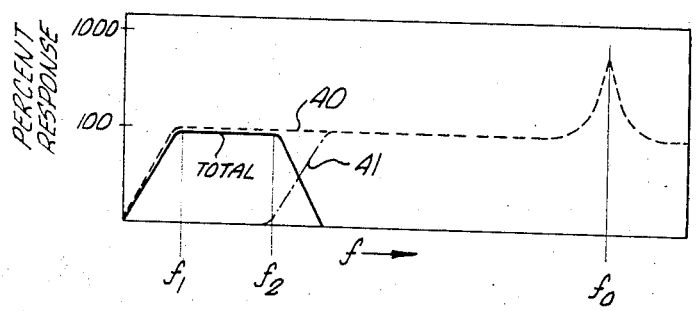
FIG. 4 is a diagram similar to that shown in FIG. 3 wherein the transducer is frequency damped to limit its operational range.

FIG. 1 shows a piezoelectric accelerometer 10 having a housing 11 which encloses an internal chamber 12. A seismic mass 13 is disposed in the chamber and is biased against the housing by a compliant mechanism shown, for the purposes of illustration, in the form of a compression spring 14.

Signal generating means are coupled to mass 13 to generate signals which have values proportional to the movement of the mass along a line vertically of the housing and which vary in frequency at the rate at which the mass oscillates along the line relative to the housing. As shown in FIG. 1, the signal generating means comprises a pair of piezoelectric crystals 15 and 16 which are engaged between the mass and the housing. As an acceleration is applied vertically to the housing, the crystals are compressed between the housing and the mass because of the tendency of the mass to remain at rest within the housing. The crystals, since they are piezoelectric crystals, produce voltages as they are compressed between the mass and the housing. These voltages are proportional to the distance the mass moves relative to the housing against the crystals. Crystals 15 and 16 are formed from any suitable piezoelectric material.

The crystals are disposed between the mass and the housing so that the voltages generated by the crystals are opposite in polarity. Thin conductive members 17, 18, and 19 are disposed between the mass and crystal 15, between crystals 15 and 16, and between crystal 16 and the housing, respectively.

A portion of an electrical connector 20 is mounted to the housing and carries a pair of transducer output terminals 21, 22 which are connected to conductive members 17, 18, and 19 as shown in FIGS. 1 and 2. A pair of conductors A and B extend away from the terminals as shown in FIG. 2. If desired the conductive members and the terminals may be wired to the crystals.

Mass 13 is exemplary of a force means which is present in most transducers. Mass 13, considered as a force means, is exemplary of a bellows or other form of force summing diaphragm in a pressure-sensing transducer, for example. The mass, in the context of this invention, is a force means in that it moves relative to a signal generating means along a predetermined line in response to variations in the physical phenomenon to be sensed so as to produce a force to which the signal generating means is responsive to generate a signal representative of the value of the phenomenon. Also, crystals 15 and 16 are exemplary of a pair of signal generating means which are provided in a transducer constructed in accord with this invention.

The graph of FIG. 3 shows the response characteristics of the individual signal generating means of transducer 10 and the overall transducer response characteristic when the transducer is frequency damped to extend its useful frequency range into the region of mechanical resonance. Dashed line 24 represents the output of crystal 15 as a function of frequency. The response curve of the crystal (response being measured in millivolts per $g$ input) climbs along slope 25 from a value of approximately 0 to an operating response level 26 (100% response) at frequency $f_L$. Above frequency $f_L$ the response is constant with changes in frequency until a resonance peak 27 is reached. At the 100% response level, crystal 15 may generate 10 millivolts for each $g$ of acceleratory input to the transducer. Except for the presence of the tuned frequency responsive means described below, the output of crystal 16 is similar to the output of crystal 15; the voltage generated by crystal 16 is of a polarity opposite to that of crystal 15 and may have a different absolute value per $g$ input. Preferably, however, crystal 16 is such that it also generates 10 millivolts per $g$ input to the transducer. Resonance peak 27 is centered about frequency $f_0$ which is the natural mechanical resonant frequency of the transducer.

A transducer constructed in accord with this invention includes a frequency responsive means 28 coupled to one of the two signal generating means of the transducer. In the case of the piezoelectric accelerometer shown in FIGS. 1 and 2, the frequency responsive means is an RC network 29 of which crystal 16 is the capacitive component. The frequency responsive means of transducer 10 also includes an impedance 30 which is coupled in parallel with crystal 16. As indicated above, crystals themselves are coupled in series between transducer output terminals 21, 22 so that the signals, i.e., the voltages produced by the crystals, oppose one another. Because of the manner in which frequency damped accelerometer 10 operates, the frequency responsive means may be considered to include impedance matching network 31 which is disposed in a telemetering system 32 to which the accelerometer is connected and which also includes an amplifier 33. The impedance matching network is connected across system input terminals 34 and 35 which, when the accelerometer is operating, are connected to the accelerometer output terminals by conductors A and B.

Frequency responsive means 28 is tuned to a selected frequency so that it suppresses the output of crystal 16 when the accelerations applied to the transducer vary at a frequency which is less than the tuned frequency. As the frequency of the applied accelerations increases above the tuned frequency, the extent of the suppression of the output of crystal 16 is progressively diminished. As a result, more of the output of crystal 16 is permitted to buck or oppose the output of crystal 15 with a corresponding effect in the total output of the transducer as manifested across accelerometer output terminals 21 and 22. RC network 29, therefore, is a highpass filter.

FIG. 3 illustrates how piezoelectric accelerometer 10 may be frequency damped to extend the flat response characteristic of the transducer into the frequency range of transducer resonance. As indicated above, accelerometer 10 has a natural resonant frequency $f_0$ at which the response of each crystal is many times its normal response. For example, at $f_0$ the response of crystal 15 may be 100 millivolts per $g$ instead of 10 millivolts per $g$. Because it is desirable that the transducer output accurately reflect the input to the transducer, most accelerometers are used only in the lower portion of the frequency range below the transducer resonant frequency. For example, if the transducer resonant frequency is 35 kc., the transducer may be used in a frequency range which extends from 10 c.p.s. ($f_L$) to a selected frequency at which the effects of resonance begin to be manifested in the output of the crystal. In the graph of FIG. 3, this selected frequency is 20% of the resonant frequency of $f_0/5$. As indicated in FIG. 3, the effects of resonance increase non-linearly between frequencies of $f_0/5$ and $f_0$. Both crystals 15 and 16 show the effects of resonance at frequencies above $f_0/5$, but the output of crystal 16 is at least partially controlled above frequency $f_0/5$.

As shown in FIG. 3, frequency responsive means 28 is tuned to a frequency of $f_0/5$. The tuned frequency is determined by the ratio of impedance 30 to the impedance defined by impedance matching network 31. For a piezoelectric accelerometer, the impedance matching network normally has an impedance of about 500 megohms. Impedance 30 may have a value of from 10,000 to 50,000 ohms, but should be as low as possible so that the voltage sensitivity of the transducer is not unnecessarily reduced.

Crystal 15 and impedance matching network 31 define an RC network which has a long time constant, i.e., a high pass filter. Accordingly, the voltage generated by the crystal is manifested in full across terminals 21 and 22, via impedance 30, when the voltage generated by the crystal varies at a frequency above that frequency ($f_L$) having a period equal to the time constant of the network. The current associated with the voltage generated by crystal 15 is on the order of picoamperes (micro-microamperes) so that the voltage drop across impedance 30 is negligible. Crystal 16 and impedance 30 define a high pass filter which has a short time constant. At low frequencies, the voltage generated by crystal 16 is blocked or suppressed relative to terminals 21 and 22. At a selected frequency, the tuned frequency of the frequency responsive means, which approaches the frequency having a period equal to the time constant of RC network 16, 30, the voltage generated by crystal 16 begins to be manifested at terminals 21 and 22 in opposition to the voltage generated by crystal 15.

Below the tuned frequency of RC network 16, 30, the output of crystal 16 is suppressed to a substantially negligible value so that the overall response characteristic of the transducer is according to solid line curve 36 of FIG. 3. The rate at which the suppression is removed from the output of crystal 16 is shown by curve 37 of FIG. 3, and is determined by the values involved in RC network 29. It has been found that the rate at which the suppression is removed from the bucking crystal of transducer 10, i.e., crystal 16, can be made to correspond to the rate at which the response of crystal 15 increases because of the effects of transducer resonance for a significant range of frequencies above the tuned frequency of the RC network. Accordingly, the flat response characteristic of the transducer is extended into the frequency range $f_0/5$ to $f_0$ by the use of this invention since the voltages produced by crystals 15 and 16 are opposite in polarity.

The extent to which the flat response of the transducer may be extended beyond $f_0/5$ is indicated by portion 38 of curve 36 in FIG. 3. The higher the resonant frequency of the transducer, the greater is the extension of curve 36 into the area under the resonance peak. For example, if the resonant frequency of a piezoelectric accelerometer is 35 kc., the flat response of the transducer may be extended from 7 kc. ($f_0/5$) to about 14 or 15 kc. (approximately $.4f_0$). Where the resonant frequency approaches 100 kc., flat response may be produced up to approximately 45 or 50 kc. (approximately $.5f_0$).

It is often desired that a transducer be used to sense variations in a physical phenomenon which occur over a limited frequency range. This invention may also be used to provide a transducer which has a flat response characteristic only in this desired frequency range. In FIG. 4, crystal 15 has a response curve 40 and crystal 16 has a response curve 41. It will be observed that the frequency at which the suppression on the output of crystal 16 is removed is much lower than in the transducer the performance of which is graphed in FIG. 3. It is desired that the transducer manifest a flat response over the frequency range from $f_1$ to $f_2$. Accordingly, the frequency responsive means associated with crystal 16 is tuned so that the output of the crystal is suppressed for frequencies below frequency $f_2$.

Figure 5:
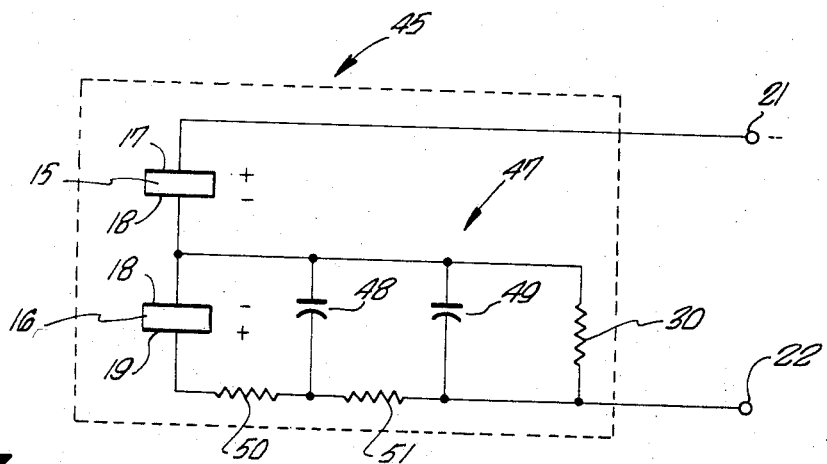
FIG. 5 is an electrical schematic diagram of an additional embodiment of the invention.
Figure 6:
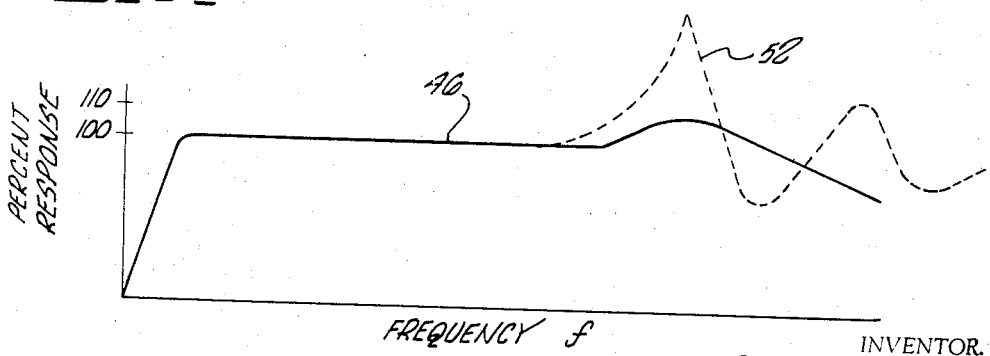
FIG. 6 is a graph of the response of a transducer according to FIG. 5.

In many instances a non-linear response may be tolerated in a transducer but it may be desired that the deviation of the response curve from flat response be limited to a predetermined extent. As shown in FIGS. 5 and 6, a piezoelectric transducer 45 may be provided with a response curve 46 as shown in FIG. 6 by means of an RC network 47 which includes a plurality of capacitances 48 and 49 and a plurality of impedances 30, 50 and 51 which are coupled in series and in parallel with each other and with crystal 16. Crystal 16 is also a capacitive component of the RC network. By proper adjustment of the values of elements 30 and 48 to 51 in network 47, a transducer having response characteristic 46 may be produced. Curve 52 in FIG. 6 is the output of crystal 15 into and through the resonant frequency of the transducer.

The frequency damping mechanisms described above have the characteristic that all signal conditioning operations on the signals produced by the transducer are performed internally of the transducer by electrical means to correct for non-linearities in transducer output attributable to mechanical sources. The components which are required to effect this characteristic are small so that the transducer itself may be small. Furthermore, a transducer incorporating the present invention has high reliability without significant increases in the cost of the transducer. The change in performance of an electrically frequency damped transducer with variations in ambient temperature is negligible; this is not true of mechanical systems for controlling the natural resonance of a transducer.

The invention has been described above with respect to two crystals for the purposes of explanation. In practice, however, it may be desired to use a single crystal so wired that it is, in effect, the equivalent of two crystals. Referring to FIG. 1, when seismic mass 13 is deflected, crystal 15 sees only the mass of mass 13, but crystal 16 sees the mass of mass 13 and crystal 15. Crystal 16, therefore, generates a greater voltage per unit deflection of mass 13 than does crystal 15, assuming the crystals are identical. To assure that equal voltages of equal magnitude but opposite polarity are generated when mass 13 is deflected, this invention encompasses a transducer which includes only a single crystal of piezoelectric material. The crystal is provided with contacts at its opposite ends and with an additional contact peripherally around its midlength. Each half of such a crystal sees only the seismic mass and thus generates equal voltages as the mass is deflected. This invention, as set forth both in the foregoing description and in the following claims, contemplates transducers including one or two crystals so arranged to generate two equal or substantially equal voltages. These voltages are so applied internally of the transducer to produce the results and effects described above.

In the foregoing description of the invention, a piezoelectric accelerometer has been referred to merely for the purposes of explaining the invention. Any transducer which produces an electrical output in response to a physical input may be frequency damped by the generation of two signals in the transducer and by the provision of a tuned frequency responsive means to which one of the signals is applied so that the one signal is suppressed below the tuned frequency and is applied in opposition of the other signal above the tuned frequency.

What is claimed is:

1. A frequency damped transducer comprising a member mounted for movement in response to variations in a selected physical phenomenon to be measured by the transducer, signal generating means coupled to the movable member for generating first and second signals having values proportional to the movement of the member, transducer output terminal means, means for connecting the signal generating means to provide an output signal across the output terminal means which is representative of the difference in the amplitude of the first and second signals, and means tuned to a selected frequency and to which the second signal is applied for passing the second signal to the terminal means substantially only when the second signal varies in amplitude at a frequency which is greater than the selected frequency.

2. A frequency damped transducer comprising a member mounted for movement along a predetermined line in response to variations in a selected physical phenomenon to be measured by the transducer, signal generating means coupled to the movable member for generating first and second electric signals having values proportional to the movement of the member along said line, transducer output terminal means, means for connecting the signal generating means to the terminal means so that the signals generated thereby oppose each other, means tuned to a selected frequency and to which the second signal is applied for suppressing the second signal when the frequency is less than the selected frequency so that substantially only the first signal is presented to the terminal means when the signals have a frequency less than the selected frequency, and means for applying the second signal to the tuned means.

3. A frequency damped transducer comprising a member mounted for oscillation along a predetermined line in response to variations in a selected physical phenomenon, first piezoelectric crystal means coupled to the movable member and having as an output a voltage proportional to the movement of the movable member, second piezoelectric crystal means coupled to the movable member and having as an output a voltage proportional to the movement of the movable member, the outputs of the crystals being substantially equal for a given movement of the movable member, a pair of transducer output terminals, means for connecting the crystals between the terminals so that the outputs of the crystals oppose each other, and means coupled to the second crystal means for suppressing the output of the second crystal means when the member oscillates along said line at a frequency less than a selected frequency.

4. A frequency damped piezoelectric transducer comprising a member mounted for oscillation along a predetermined line in response to variations in a selected physical phenomenon, first piezoelectric crystal means coupled to the movable member and having as an output a first voltage proportional to the movement of the movable member, second piezoelectric crystal means coupled to the movable member and having as an output a second voltage proportional to the movement of the movable member, the first and second voltages being related by a preselected ratio for a given movement of the movable member, a pair of transducer output terminals, means for connecting the crystals in series between the terminals so that the outputs of the crystals oppose each other, and means coupled to the second crystal means for suppressing the output of the second crystal means when the member oscillates along said line at a frequency less than a selected frequency.

5. A piezoelectric transducer according to claim 4 wherein the means for suppressing the output of the second crystal means comprises an impedance coupled in parallel with the second crystal means.

6. A piezoelectric transducer according to claim 4 wherein the means for suppressing the output of the second crystal means comprises an RC network coupled in parallel with the second crystal means.

7. In a piezoelectric transducer, the combination comprising force means movable in response to variations in a physical quantity to be measured by the transducer, first piezoelectric crystal means coupled to the force means so as to produce a first voltage of predetermined polarity in response to movement of the force means in a selected direction, second piezoelectric crystal means coupled to the force means so as to produce, when the force means moves in said direction, a second voltage opposite in polarity to the first voltage, means for coupling the crystals between a pair of transducer output terminals so that the outputs of the crystals are subtractive, and means coupled to the second crystal means operable for suppressing the manifestations of the second voltage at the output terminals to a substantially negligible value relative to the first voltage when the force means oscillates at a frequency below a selected frequency.

8. A piezoelectric accelerometer comprising a housing, a seismic mass mounted in the housing for movement along a predetermined line in response to accelerations applied in a selected direction to the housing, the seismic mass moving along the line an amount proportional to and at the frequency of application of said accelerations, a first piezoelectric crystal means supported between the housing and the mass for generating a voltage proportional to the movement of the mass when the mass moves in one direction along said line, a second piezoelectric crystal supported between the housing and the mass for generating a voltage proportional to the movement of the mass in the same direction along said line, the voltages generated by the crystals being of opposite polarity, a pair of transducer output terminals carried by the housing, means for connecting the crystals in series between the terminals so that the voltages generated by the crystals oppose each other, each crystal having a capacitance, and an RC network of which the second crystal is a component for suppressing algebraic addition of the voltages when the mass oscillates along said line at a frequency less than a selected frequency so that substantially only the voltage generated by the first crystal is manifested across the output terminals when the mass oscillates below said selected frequency and so that the voltage manifested across the output terminals when the mass oscillates at a frequency greater than said selected frequency is the voltage generated by the first crystal diminished by the voltage generated by the second crystal.

9. A piezoelectric accelerometer according to claim 8 wherein the RC network consists of the second crystal and an impedance coupled in parallel with the second crystal.

10. A piezoelectric accelerometer according to claim 8 wherein the RC network comprises the second crystal and an impedance coupled in parallel with the second crystal.

11. A piezoelectric accelerometer according to claim 8 wherein the RC network comprises a plurality of capacitances and impedances coupled in series and in parallel with each other and with the second crystal.

12. A piezoelectric accelerometer according to claim 8 wherein the voltages generated by the crystals are substantially equal for given movements of the mass in the selected direction along the predetermined line and the selected frequency is selected as the frequency at which the effects of transducer resonance are manifested in the output of the first crystal so that the response of the transducer is essentially flat into the frequency range in which transducer resonance normally is manifested.

13. A piezoelectric accelerometer according to claim 12 in which the selected frequency is about 20 percent of the natural resonant frequency of the transducer.

References Cited
UNITED STATES PATENTS 2,272,984　2/1942　Ritzmann _____ 73—71.2 X
2,857,462　10/1958　Lin.

JAMES J. GILL, *Primary Examiner.*

RICHARD C. QUEISSER, *Examiner.*